Dec. 20, 1960      A. A. HUCHOK      2,965,015
AUTOMATIC COOKING APPARATUS
Filed Aug. 4, 1958      5 Sheets-Sheet 1
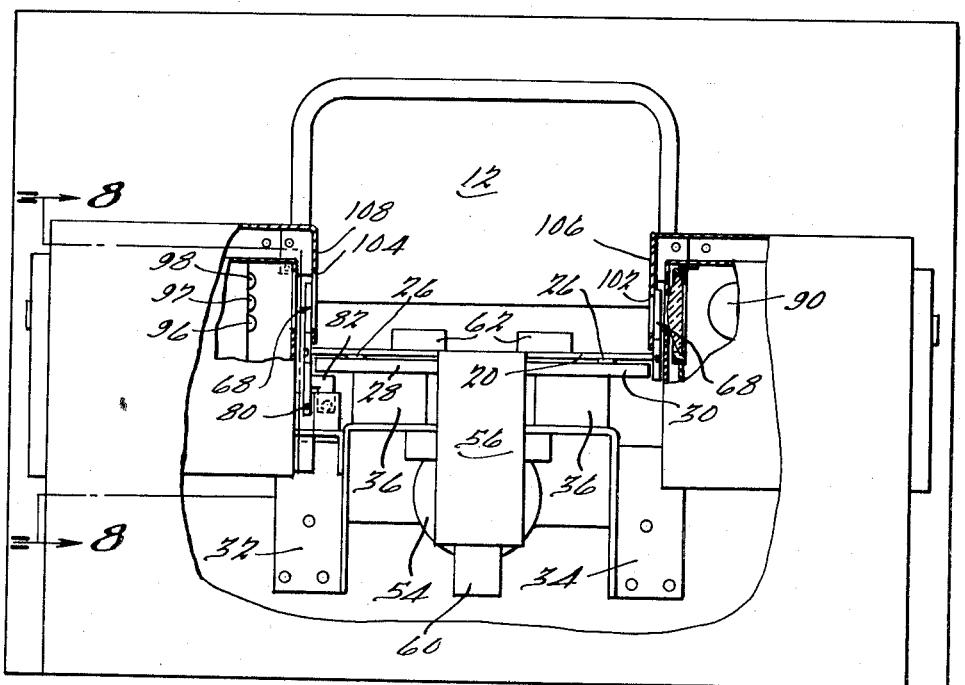
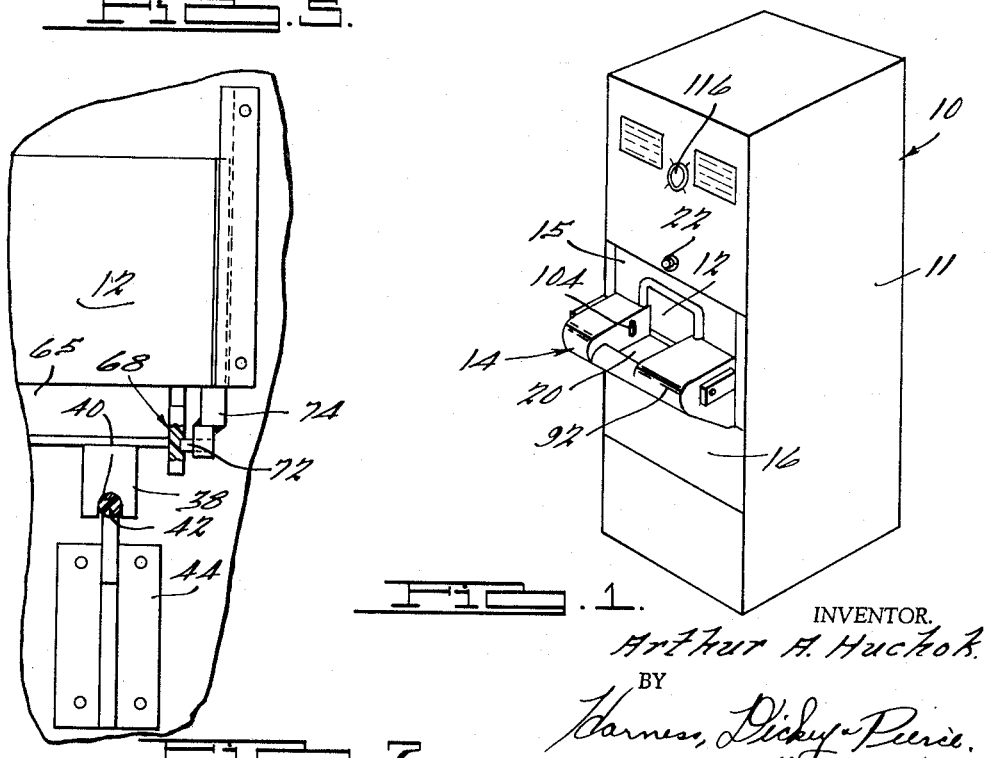
INVENTOR.
Arthur A. Huchok.
BY
Harness, Dickey & Pierce.
ATTORNEYS.

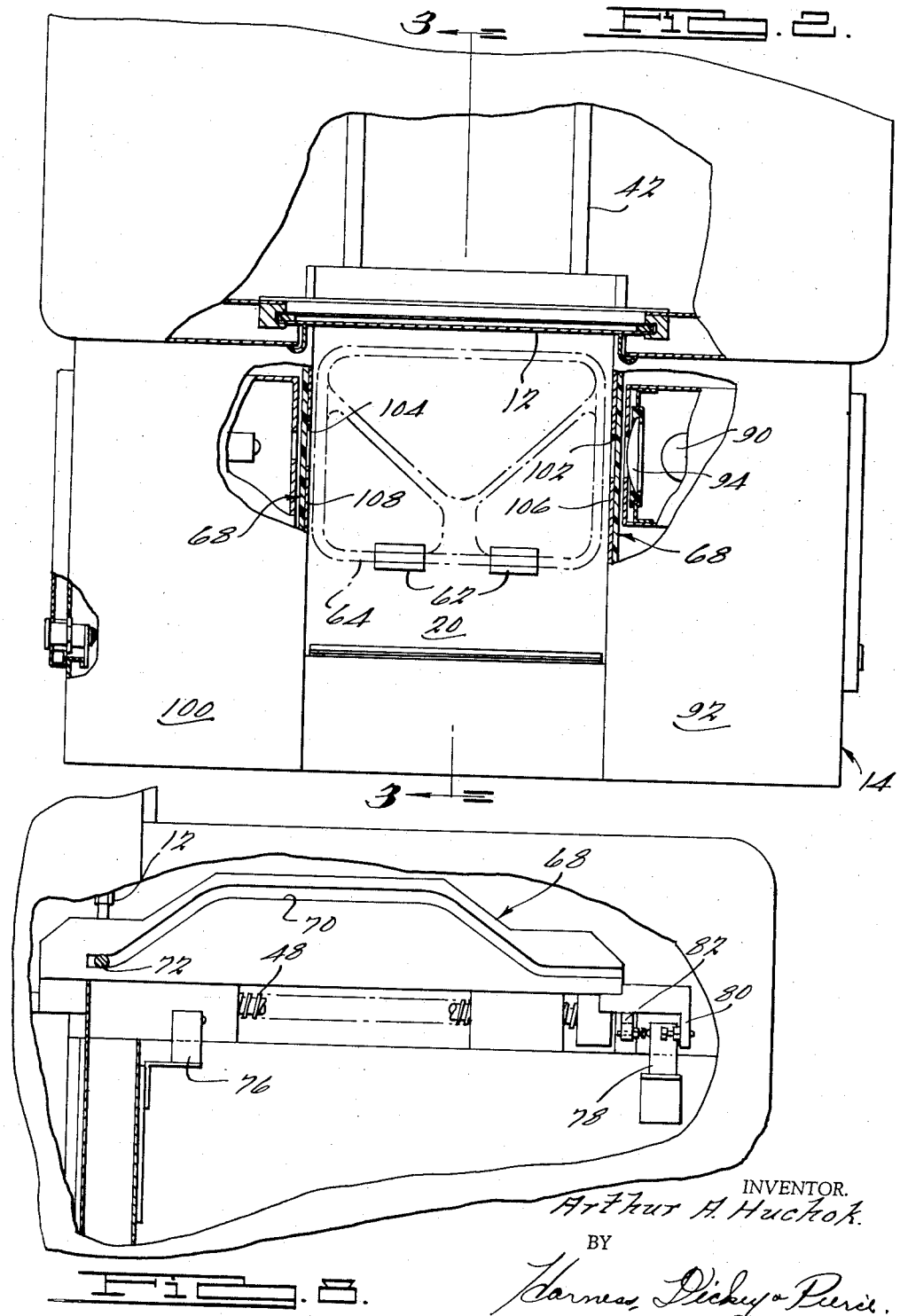

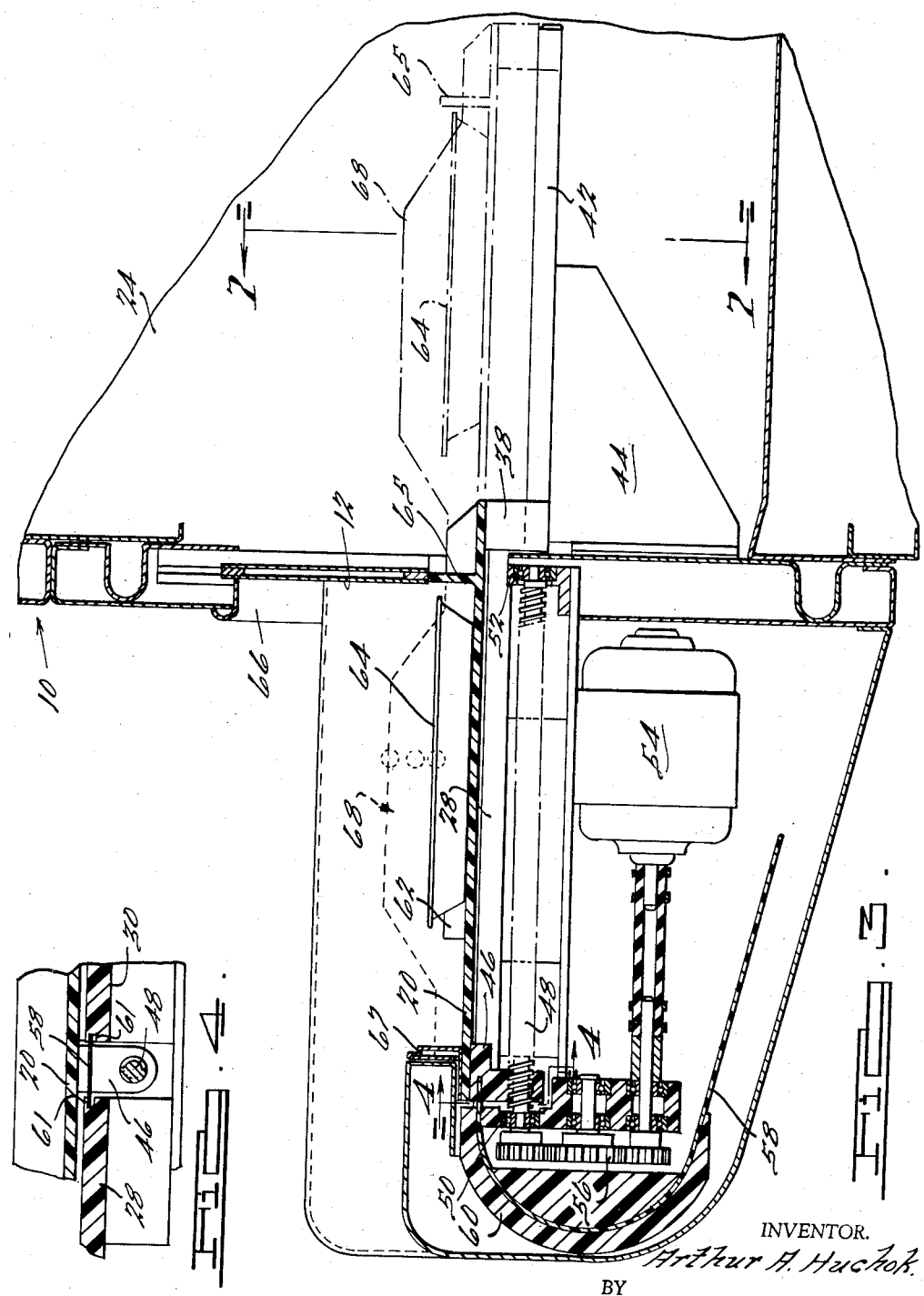

Dec. 20, 1960  A. A. HUCHOK  2,965,015
AUTOMATIC COOKING APPARATUS
Filed Aug. 4, 1958  5 Sheets-Sheet 4
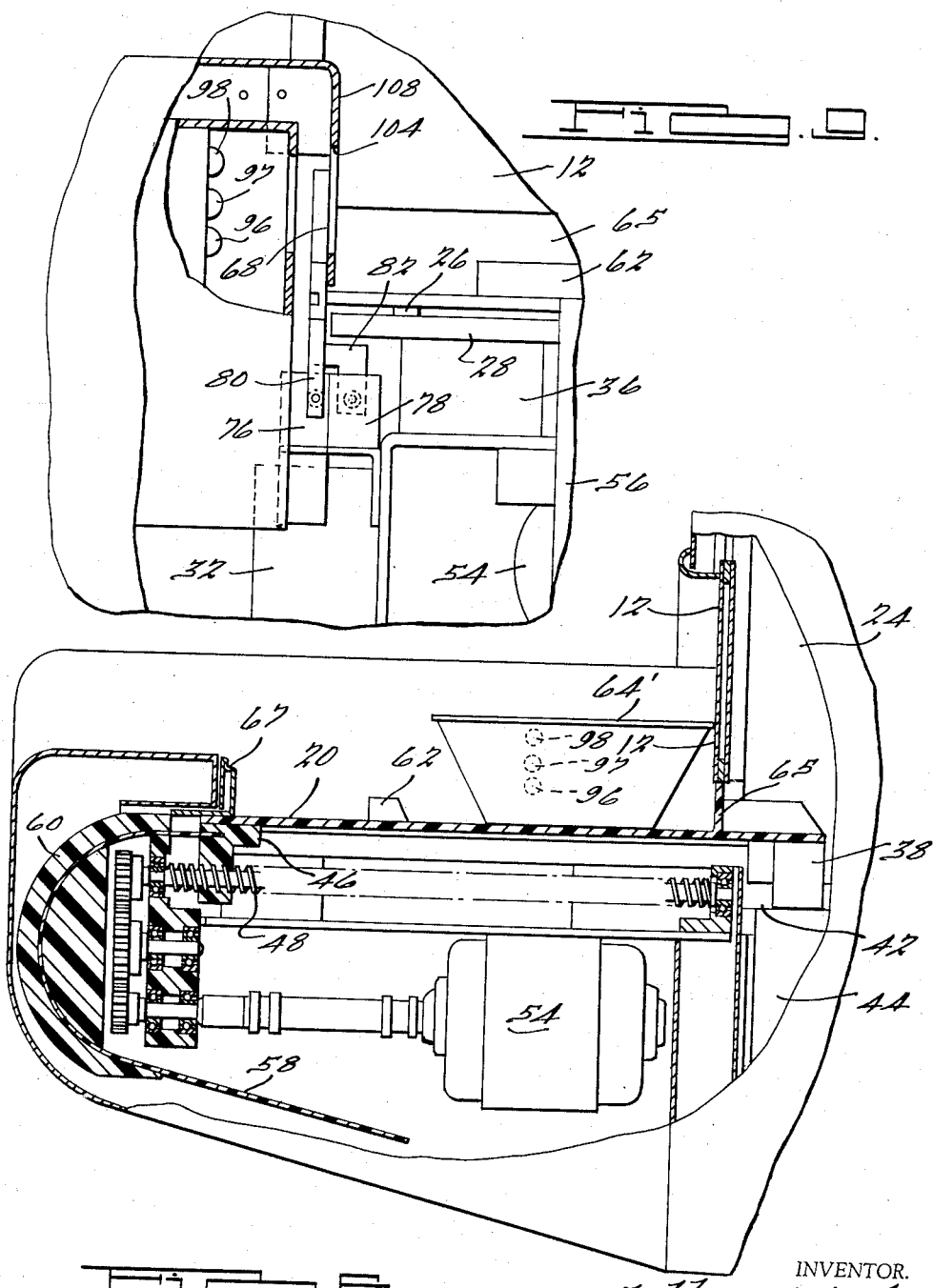
INVENTOR.
Arthur A. Huchok.
BY
Harness, Dickey & Pierce
ATTORNEYS.

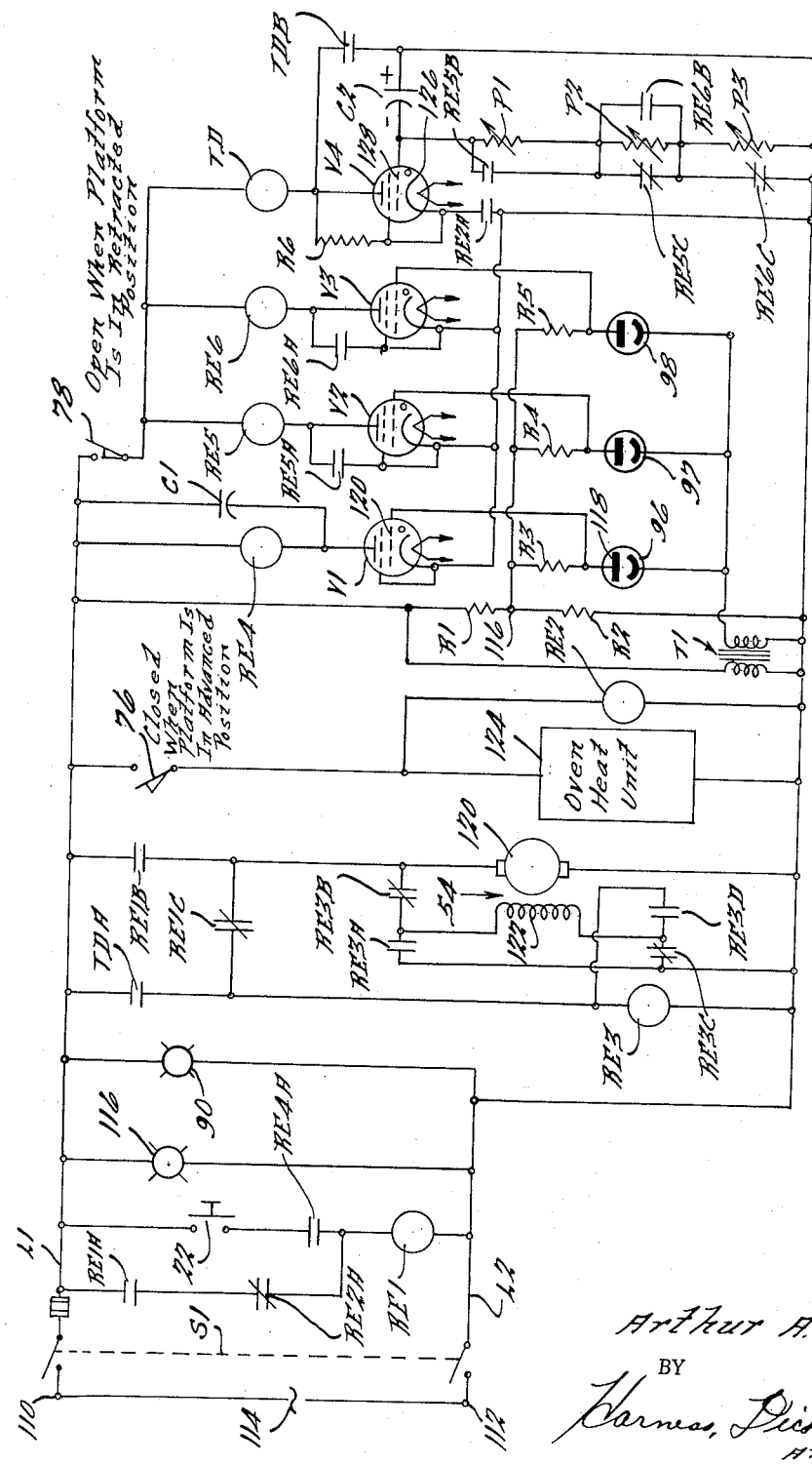

United States Patent Office

2,965,015
Patented Dec. 20, 1960

2,965,015

AUTOMATIC COOKING APPARATUS

Arthur A. Huchok, Warren, Mich., assignor, by direct and mesne assignments, of one-half to William F. Tydings, Detroit, and one-half to Alfred K. Ryan, Royal Oak, Mich.

Filed Aug. 4, 1958, Ser. No. 752,848

6 Claims. (Cl. 99—327)

The present invention pertains to improved automatically controlled cooking apparatus including automatic loading and unloading conveyor means.

Ovens using high frequency electromagnetic radiant energy heating devices have recently been developed for both commercial and domestic use, which are capable of efficiently heating many foods in relatively short times. A typical device of this type is one currently marketed under the trade name "Radarange" and is capable of heating many foods from a freezing temperature to a serving temperature in a matter of seconds; the exact time depending upon the mass of the food and the total heat input required. Such devices have been found particularly well adapted for use in automatic vending apparatus and in short-order kitchens since their cooking speed permits exceptionally rapid service of freshly heated foods.

The apparatus of the present invention is especially suited for use with a cooking device of this type, and, it is thought, will find its widest use in establishments such as cafeterias and short-order restaurants where it is often advantageous to store prepared foods at a low temperature and to heat them immediately before serving. The apparatus includes means for automatically loading food into the oven, energizing the oven heating device for any one of several predetermined time periods, and then withdrawing the food from the oven. The selection of the proper heating period is accomplished automatically in the illustrated embodiment of the invention so that the apparatus requires no supervisory attention and may be operated by cafeteria customers.

Accordingly, one important object of the present invention is to provide improved automatic cooking apparatus.

Another object is to provide improved apparatus for use in combination with a high frequency electromagnetic cooking device, for automatically loading food into the device, controlling the cooking time therein and withdrawing the food therefrom.

Another object is to provide improved oven loading and unloading apparatus including a control arrangement for energizing the oven for one of several predetermined time periods, and for automatically selecting a particular time period according to the type of container used for holding the food or other material to be heated.

These and other objects and advantages of the invention will become apparent from a reading of the following detailed description of a preferred embodiment thereof, taken in conjunction with the drawings, wherein:

Figure 1 is a perspective view of cooking apparatus according to a preferred embodiment of the present invention;

Fig. 2 is a plan view, partly in section, of the apparatus shown in Fig. 1;

Fig. 3 is a fragmentary cross-sectional view of the apparatus shown in Fig. 2, taken along the line 3—3 thereof and showing the apparatus in one operative position;

Fig. 4 is a fragmentary longitudinal section of the apparatus shown in Fig. 3, taken along the section line 4—4 thereof;

Fig. 5 is a front elevational view, partly in section, of the apparatus shown in Fig. 1;

Fig. 6 is a cross-sectional view generally similar to the view of Fig. 3, but showing the apparatus in a different operative position;

Fig. 7 (Sheet 1) is a fragmentary longitudinal section taken along the line 7—7 of Fig. 3;

Fig. 8 is a fragmentary cross-sectional view taken generally along the line 8—8 of Fig. 5;

Fig. 9 is a fragmentary longitudinal sectional view particularly showing the limit switch arrangement for controlling the travel of the conveyor element of the apparatus; and Fig. 10 is a schematic diagram of an electrical control circuit for use with the apparatus showing in the preceding figures.

Referring first to Fig. 1, the operative components of the apparatus according to the preferred embodiment of the invention are housed in a trim cabinet 10, the upper portion of which houses electronic equipment for generating electromagnetic radiant energy, which equipment in itself constitutes no part of the present invention and need not be described herein. In the central portion 11 of the cabinet there is an enclosed oven chamber having an access door 12. A loading and unloading conveyor unit 14 is mounted upon a front wall panel 15 of the cabinet adjacent to the access door 12, and electronic control circuits are housed within the cabinet 10 behind a lower panel 16 for controlling the conveyor unit 14 and the electronic generating equipment.

In operation when the apparatus is installed in a cafeteria, for example, the cafeteria customer selects his food, which is stored in a container in a cold storage compartment, and places it on a platform 20 in the conveyor unit 14. The customer then presses a button 22 in the front wall of the cabinet immediately above the access door 12. The apparatus then automatically opens the door 12, transports the food into the oven chamber, energizes the oven heating device when the food reaches its proper position within the oven chamber, then de-energizes the heating device after a predetermined period, and withdraws the food from the oven to be picked up by the customer.

Referring now to the other figures, the conveyor unit 14 is mounted on the front wall panel 15 of the cabinet 10, and includes a platform 20 which is mounted for horizontal travel into and out of the oven compartment 24 (Fig. 3). As perhaps best shown in Fig. 5, the platform 20 is supported exteriorly of the oven chamber 24 upon a pair of rails, or wear plates 26 which are fixed upon left- and right-hand supporting plates 28 and 30, respectively. The plates 28 and 30 are mounted externally of the cabinet 10 immediately adjacent to the door 12 upon a pair of rigid brackets 32 and 34, being spaced upwardly therefrom by spacer blocks 36. As shown in Fig. 3, the forward end of the platform 20 extends into the oven chamber 24 and carries a pair of depending blocks 38, the bottom surfaces of which are grooved as at 40 (Fig. 7) to receive rails 42, which are rigidly supported within the oven 24 upon angle brackets 44 for supporting and guiding the platform 20 within the oven.

A follower nut 46 is fixedly secured beneath the platform 20 at the rear thereof, and extends downwardly between the supporting plates 28 and 30. The nut 46 engages a lead screw 48, which is rotatably mounted beneath the platform, being journaled at its ends in anti-friction thrust bearings 50 and 52. A reversible electric motor 54 is suspended beneath the lead screw 48 upon the brackets 32 and 34, and is connected through a speed reducing gear train 56 to drive the lead screw 48.

As best shown in Figs. 3 and 4, a flexible, resilient sheet member 58 is secured to the follower nut 46 and extends rearwardly therefrom through a slotted guide member 60. As the platform 20 is driven forwardly into the oven 24, the flexible member 58 is drawn along behind the platform to cover the drive screw 48, thereby protecting it from dust and debris that might otherwise fall upon it. The flexible member 58 is supported in and guided by notches 61 formed in the edges of the plates 28 and 30, respectively, as it is drawn forwardly with the platform. When the platform 20 is fully retracted, the flexible member 58 is disposed within the guide member 60, being curled around and smoothly turned back upon itself in a downward direction so that its free end projects forwardly.

A pair of positioning bumpers 62 are fixed on the upper surface of the platform 20 near the rear thereof for positioning a food container, such as the container 64 illustrated (Fig. 3) upon the platform, so that the container will be in proper position in the oven for optimum heating efficiency when the platform arrives at its limit position in the oven. The customer places the container 64 upon the platform 20 between the bumpers 62 and the door 12. The bumpers 62 serve as a rear positioning stop to insure that the container 64 will be positioned sufficiently far forwardly in the oven chamber. The door 12 and a forward wall 65 fixed to the platform 20 serve as forward positioning stops.

As shown in Fig. 6, when a relatively high and narrow container 64' is used, it may be placed by the customer too far forwardly on the platform 20. In this event, the container 64' strikes the door 12 as the container is carried forwardly by the platform 20. The container 64' is then held from moving with the platform until the door is raised to its open position, at which time the container 64' is released and again travels with the platform. The containers 64 and 64' are preferably proportioned with this positioning function in mind, so that the food is always properly positioned in the oven chamber 24 when the platform 20 arrives at its advanced limit position in the oven.

Referring now to Figs. 7 and 8, the door 12 is mounted for smoothly guided vertical travel in the front panel 15 of the cabinet, and is cam driven by the platform 20, which is provided with vertical side walls 68 having cam-shaped slots 70 along their outer surfaces for opening and closing the door 12. Follower pins 72 carried on brackets 74 fixed to the door 12 project laterally into the slots 70 and carry the door 12 up and down in response to the travel of the platform 20. The slots 70 are shaped so that the door is fully closed when the platform 20 is fully retracted, and also when the platform 20 is fully advanced, and is raised during an intermediate portion of the travel of the platform 20 between its fully advanced and fully retracted position.

In order to minimize the needed vertical travel of the door 12, the platform is provided with forward and rear wall portions 65 and 67, respectively, which are engaged by the bottom edge of the door when the door is closed. It may also be pointed out that when the apparatus of the invention is used in conjunction with ovens having certain types of heating units, such as those having high frequency electromagnetic heating devices of the tuned type, it is preferable to make all of the parts of the apparatus which project into the oven chamber 24 of a dielectric material such as molded plastic in order not to affect adversely the tuning of the oven or to absorb energy from the heating device.

Limit switches 76 and 78 are mounted upon one of the main supporting brackets 32 and 34, being illustrated on the left-hand bracket 32 as viewed in Fig. 9 for controlling the operation of the apparatus in response to the travel of the platform 20. The platform 20 carries a pair of depending striker plates 80 and 82 for actuating the limit switches 76 and 78, respectively.

When the food is prepared, it is placed in containers of different heights according to the cooking times required for the different foods. Foods requiring relatively short heating periods, for example, may be placed in low containers such as the container 64 (Fig. 3) while those requiring a relatively long heating period may be placed in high containers such as the container 64' (Fig. 6). In the illustrated embodiment, provision is made also for the use of containers of intermediate height (not illustrated) for foods requiring a third, different heating period.

The conveyor unit 14 includes a photoelectric sensing device for selecting the desired heating periods for the different foods according to the height of the container placed upon the platform 20. A light source 90 (Fig. 2) is mounted within a housing 92 at one side of the platform 20 and directs a beam of light through a collimator lens 94 across the platform 20 toward three photocells 96, 97, and 98, which are arranged in vertical array within a second housing 100 at the opposite side of the platform. The photocells 96, 97, and 98 are vertically spaced so that only the bottom one 96 is shielded by a low food container 64, and all three are shielded by a high container 64', while only the bottom two 96 and 97 are shielded by a container of intermediate height.

The platform side walls 68 are made of transparent material, such as glass or Lucite, to permit light to pass from the light source 90 to the photocells 96, 97 and 98. Also, appropriate apertures 102 and 104 are provided in the metal shrouds 106 and 108, respectively, which extend downwardly over the side walls 68 of the platform on the inner sides thereof.

The photocells 96, 97 and 98 are arranged in a control circuit with the push button 22 for controlling the operation of the conveyor unit 14 and of the oven heating unit. When a food container is placed upon the platform 20 and the push button 22 is thereafter actuated, the control circuit is energized and operates first to drive the motor 54 in one direction to move the platform 20 into the oven chamber 24, the door 12 opening and closing during the travel of the platform. After the platform is fully advanced into the oven chamber 24, the motor 54 is stopped and the oven heating device is energized for a predetermined time period depending upon whether the two upper photocells 97 and 98 were illuminated by the light source 90 at the time the push button 22 was actuated. If both of the two upper photocells 97 and 98 were illuminated, that is, if a low container 64 were placed upon the platform, the oven heating device is energized for one period, which may be, for example, a relatively short period of about ten seconds. If neither one of the two upper photocells 97 and 98 were illuminated, that is, if a high container 64' (Fig. 6) were placed upon the platform 24 at the time the push button 22 was actuated, the oven heating device is energized for a different period, such as, for example, a relatively long period of about fifty seconds to one minute. Likewise, a third, different energization time for the oven heating unit may be provided in the event a container of intermediate height is used, which shields only the lower two photocells 96 and 97, and leaves the top photocell 98 illuminated.

At the end of the selected time period, the oven heating device is de-energized, and the motor 54 is energized in the reverse direction to retract the platform 20, together with the food container 64 or 64' thereon, back to its initial starting position so that the food may be readily removed by the customer.

One control and timing circuit for use with the apparatus according to the present invention is shown schematically in Fig. 10, and includes a pair of terminals 110 and 112 for connection to an alternating current power source 114. The terminals 110 and 112 are connected through a disconnect switch S1 to the main power lines L1 and L2 of the circuit. An indicating lamp 116 and the light source 90 are connected directly between the power lines L1 and L2 and are energized as soon as the line switch S1 is closed. (The indicating lamp 116 in the embodiment shown is mounted upon the front panel 16 of the cabinet 10.) A pair of resistors R1 and R2 are connected between the lines L1 and L2 to provide a voltage dividing network, and the photocells 96, 97 and 98 are connected between the common terminal 116 of the two resistors R1 and R2 and the line L2, in series with separate load resistors R3, R4 and R5, respectively. The plate 118 of the bottom photocell 96 is directly connected to the control grid 120 of a thyratron type discharge tube V1, which is connected between the lines L1 and L2 in series with a relay RE4, the contacts RE4A of which are connected in series with the push button 22 and with a starting relay RE1 across the lines L1 and L2. Similarly, the other two photocells 97 and 98 are connected to the control grids of second and third tyratrons V2 and V3, respectively, for controlling two additional relays RE5 and RE6.

A capacitor C1 is connected in parallel with the first relay RE4 to smooth out the current through the relay winding, permitting current to continue to flow through the winding during those portions of the alternating current cycle that the thyratron tube V1 is cut off, and also preventing the building up of excessive induced voltages across the tube V1. The other two relays V5 and V6 are provided with self-holding contacts RE5A and RE6A, respectively, and do not require corresponding capacitors.

In operation, when a container 64 or 64' is placed upon the platform 20, the bottom photocell 96 is shielded from the light source 90 and its conductivity is thereby reduced, increasing the alternating current potential applied to the control grid 120 of the thyratron V1 and permitting the thyratron V1 to fire, and thus energizing the relay RE4. The thyratron V1 continues to fire, and the relay RE4 remains energized so long as the bottom photocell 96 is shielded. This action holds the contacts RE4A closed and thus enables the circuit including the push button 22.

After the container 64 or 64' is placed upon the platform 20, the customer momentarily actuates the push button 22 to start the apparatus in operation. Actuation of the push button 22 energizes the relay winding RE1, the holding contacts RE1A of which are connected in shunt with the push button 22 and the contacts RE4A so that the winding RE1 remains energized until another relay contact RE2A is opened by further action of the apparatus.

Energization of the relay RE1 also closes the contacts RE1B, which are in series circuit with the motor 54, and in the condition of the circuit illustrated in Fig. 10, operate to energize the motor in the advancing direction to drive the carriage 20 into the oven chamber 24. The armature 120 and the field winding 122 of the motor are brought out to separate terminals (not separately designated) and the field winding 122 is connected through a set of reversing relay contacts RE3A, RE3B, RE3C, and RE3D, which are controlled by a relay RE3. The relay RE3 is not energized at this time, since it is in series with the now open, normally closed contacts RE1C of the relay RE1. The motor 54 continues to operate, driving the platform 20 into the oven 24 until the normally open advance position limit switch 76 is actuated. Closing of the limit switch 76 energizes the relay RE2, thereby opening the contacts RE2A and de-energizing the relay RE1. Closing of the limit switch 76 also energizes the oven heating unit 124, which remains energized until the limit switch 76 is opened.

Now, the length of time that the platform 20 remains in its fully advanced position in the oven chamber 24, during which time the oven heat unit 124 remains energized is determined by a time delay circuit including the thyratron type discharge tube V4 which is connected between the lines L1 and L2 through the normally closed, retracted position limit switch 78. This limit switch 78 is normally held open by the platform 20 while the platform is in its fully retracted position, and closes as soon as the platform 20 advances slightly away from its fully retracted position, thus applying full line voltage to the time delay circuit. During the period that the platform is moving from its retracted to its advanced position, a capacitor C2 is charged through a circuit including the winding of a relay TD, a resistor R6, and the cathode 126 and control grid 128 of the gas tube V4. The capacitor C2 is connected in the control grid circuit of the tube V4 and becomes charged in a direction to keep the tube V4 cut off. The grid 128 and the cathode 126 acts as a rectifier to insure a unidirectional charge accumulation on the capacitor C2.

During the travel of the platform 20, the tube V4 is kept from conducting plate current by normally opened contacts RE2A of the relay RE2, which contacts are series connected in the cathode circuit of the tube. When the platform 20 arrives in its advanced position in the oven 24 closing the limit switch 76, the relay RE2 is energized, thereby closing the contact RE2A and enabling the plate current circuit of the thyratron V4 by connecting the cathode 126 directly to the line L2. The tube V4 remains nonconductive, however, due to the charge on the capacitor C2 until the capacitor C2 discharges through one or another of three adjustable potentiometers P1, P2, and P3. When the circuit is in the condition shown, the capacitor C2 discharges through the potentiometer P1, since the contacts RE5B are open and the contacts RE5C and RE6C are closed.

The potentiometer P1 is adjusted to provide a desired discharge time constant for the capacitor C2 so that the charge on the capacitor C2 is reduced sufficiently to permit the thryatron V4 to conduct at the end of the predetermined time period desired for heating foods contained in the low container 64 (Fig. 3).

When the tube V4 starts to conduct, its plate current energizes the time delay relay TD, thereby closing the contacts TDA which are connected in the motor circuit for energizing the motor in the reverse direction. Closing of the contacts TDA applies the full line voltage across the motor armature 120, and also energizes the relay RE3 to reverse the connections of the motor field winding 122. The motor 54 is thus energized to retract the platform 20 from the oven chamber 24.

As soon as the platform 20 moves only slightly from its fully advanced position, the limit switch 76 opens to de-energize the oven heat unit 124 and the relay RE2. De-energization of the relay RE2 opens the contacts RE2A thereby cutting off plate current in the time delay thyratron V4. The time delay relay TD, however, remains energized by reason of the circuit provided by its holding contacts TDB, until the platform 20 reaches its fully retracted position, at which time the limit switch 78 is opened. Opening of the limit switch 78 de-energizes the entire time delay circuit, causing the contacts TDA to open and thereby de-energizing the motor and restoring the circuit to its initial condition ready for the next cycle of operation.

The time delay, that is, the cooking time, is determined as hereinabove explained, by the time constant of a selected one of the potentiometers P1 to P3 and the capacitor C2, and the photocells 97 and 98 are arranged to control the thyratron type tubes V2 and V3 for switching the potentiometers P1 to P3 selectively into the discharge circuit of the capacitor C2. When the photocells 97 and 98 are illuminated, they are relatively highly conductive and keep the control grids (not separately designated) of the thyratrons V2 and V3 at cutoff potential so that they do not conduct, and no current flows to energize the relays RE5 and RE6, which are series connected in the plate current circuits of the tubes V2 and V3, respectively. In this state, therefore, the capacitor C2 discharges through the potentiometer P1, and the potentiometers P2 and P3 are shunted by the closed relay contacts RE5C and RE6C.

When, now, the intermediate photocell 97 is shielded from the light, an increased potential is applied to the control grid of the thyratron tube V2, permitting the tube to conduct as soon as the switch 78 closes, thereby energizing the relay RE5, which is thereafter held closed by its self-holding contacts RE5A. Energization of the relay RE5 closes the contacts RE5B, thus shunting the potentiometer P1 out of the capacitor circuit, and opens the contacts RE5C, thus removing the shunt from the potentiometer P2 and leaving the potentiometer P2 in series with the capacitor C2.

When a maximum height container such as the container 64' is placed upon the platform, both of the upper photocells 97 and 98 are shielded, so that when the limit switch 78 closes, both of the thyratrons V2 and V3 conduct and both of the relays RE5 and RE6 are energized. When these relays are energized, they are held closed through their holding contacts RE5A and RE6A. The contacts RE5B and RE6B close and the contacts RE5C and RE6C open, thereby shunting the potentiometers P1 and P2 and opening the shunt around the potentiometer P3, leaving the potentiometer P3 in series with the capacitor C2.

The potentiometers P1, P2, and P3 may be separately adjusted independently of each other to provide desired heating periods for the foods in the various sized containers within the range permitted by the values of the potentiometers and the capacitors C2.

It should be pointed out that the value of the charging resistor R6 in the time delay circuit is preferably made relatively small so that the capacitor C2 may be fully charged during the relatively short time it takes to drive the platform 20 from its fully retracted to its fully advanced positions. However, the resistance value of the resistor R6 is made sufficiently large so that the charging current for the capacitor C2 is not sufficient to energize the time delay relay TD.

What is claimed is:

1. Apparatus for conveying an article to be heated into an oven retracting it therefrom and controlling its dwell time therein comprising a conveyor device for receiving and supporting the article to be heated, means for supporting said device adjacent to the oven, controllable driving means for moving said device into the oven and retracting it therefrom, control means for controlling said driving means in response to the travel of said device, and timing means cooperative with said control means for controlling the dwell time of said device in said oven in response to a predetermined characteristic of the article received by said device.

2. Heating apparatus especially suited for short-order self-service cooking comprising an oven having a movable door, an energy device for heating an article in said oven, a conveyor device for transporting an article to be heated through said door into said oven and retracting it therefrom, means for opening and closing said door in response to the travel of said conveyor device, drive means for driving said conveyor device, and control means for controlling said drive means and said energy device, said control means including a sensing device for sensing a characteristic of an article transported by said conveyor device, and means for timing the energization of said energy device in response to said characteristic.

3. Heating apparatus especially suited for short-order self-service cooking comprising an oven having a movable door, an energy device for heating an article in said oven, a conveyor device for transporting an article to be heated through said door into said oven, causing it to dwell therein, and then retracting it therefrom, means for opening and closing said door in response to the travel of said conveyor device, reversible drive means for driving said conveyor device, control means for controlling said drive means and said energy device, sensing means for sensing the size of an article transported by said conveyor device, said control means including means responsive to said sensing means for synchronously controlling the period of energization of said energy device and the dwell time of the article in said oven, said control means being arranged to energize said energy device only when said conveyor device is in a predetermined position in said oven and to energize said drive means in a direction to retract the article to be heated from the oven immediately after the expiration of the period of energization of said energy device.

4. Heating apparatus especially suited for a short-order self-service cooking comprising an oven having a movable door, an energy device for heating an article in said oven, a platform mounted adjacent to said door for movement through the door opening into and out of said oven, a light source arranged to project a beam of light across said platform from one side thereof, a plurality of vertically spaced photosensitive devices at the opposite side of said platform for receiving light from said light source, driving means for driving said platform into and out of said oven, control means for controlling said driving means responsively to the travel of said platform and for energizing said energy device while said platform is in a predetermined position in said oven, said control means including timing means for causing said platform to dwell in said predetermined position for a selected one of a plurality of predetermined periods, and means for selecting one of said periods in accordance with the number of said photosensitive devices that are shielded from said light source by an article supported on said platform.

5. Heating apparatus especially suited for short-order self-service cooking comprising an oven having a movable door, an energy device for heating an article in said oven, a platform mounted adjacent to said door for movement through the door opening into and out of said oven, transparent side walls fixed to said platform, cam means carried by said side walls, cam follower means connected to said door and cooperative with said cam means for opening and closing said door in response to travel of said platform, a light source arranged to project a beam of light across said platform and through said side walls, a plurality of vertically spaced photosensitive devices for receiving light projected across said platform by said source, driving means for driving said platform into and out of said oven, control means for controlling said driving means responsively to the travel of said platform and for energizing said energy device while said platform is in a predetermined position in said oven, said control means including timing means for causing said platform to dwell in said predetermined position for a selected one of a plurality of predetermined periods, and means for selecting one of said periods in accordance with the number of said photosensitive devices that are shielded from said light source by an article supported on said platform.

6. Apparatus for conveying an article to be heated into an oven retracting it therefrom and controlling its dwell time therein comprising a conveyor device for receiving and supporting the article to be heated, means for supporting said device adjacent to the oven, controllable driving means for moving said device into the oven and retracting it therefrom, control means for for controlling said driving means in response to the travel of said device, and timing means cooperative with said control means for controlling the dwell time of said device in said oven in response to the height of the article received by said device.

(References on following page)

References Cited in the file of this patent

UNITED STATES PATENTS

| | | | |
|---|---|---|---|
| 1,283,185 | Hirschman | Oct. 29, 1918 |
| 1,690,272 | Cope | Nov. 6, 1928 |
| 2,361,446 | Anderson | Oct. 31, 1944 |
| 2,532,894 | Currier | Dec. 5, 1950 |
| 2,621,584 | Palmer | Dec. 16, 1952 |
| 2,631,524 | Theisen | Mar. 17, 1953 |
| 2,724,322 | Parr | Nov. 22, 1955 |